Patented Apr. 7, 1936

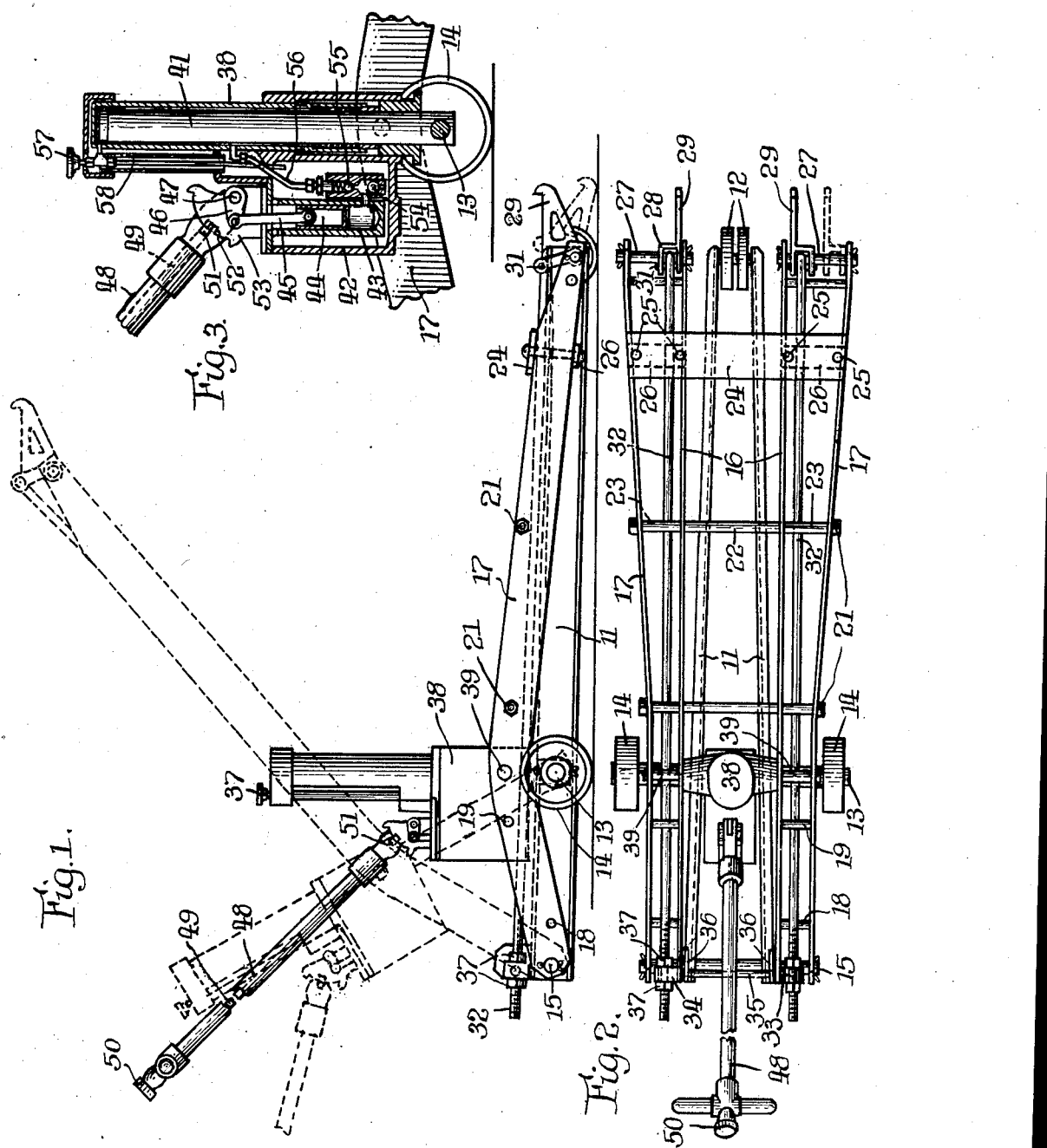

2,036,654

UNITED STATES PATENT OFFICE 2,036,654

JACK

Harry F. Stieler, Chicago, Ill., assignor to Altos Hydraulic Devices Company, Chicago, Ill., a corporation of Illinois Application June 22, 1935, Serial No. 27,830

9 Claims. (Cl. 254—2)

The present invention relates to lifting jacks and concerns more particularly truck-jacks, such as are used for raisng and lowering automobiles, etc., one of its leading aims being the provision of a construction of this general character which is simple in structure, which is comparatively economical to manufacture, which is strong and sturdy, which has a capacity for raising the automobile or a portion thereof to an unusual height, which can be lowered practically to the ground to obtain proper engagement with any desired part of the vehicle, which is easily operated, and which is unlikely to become injured or damaged in ordinary service.

A further object of the invention is to supply a lifting jack of this type with a pair of saddles to engage the automobile during its elevation and descent, including means for adjusting the space or distance between the saddles to adapt the appliance for ready use with vehicles of different structural characteristics.

An added purpose of the invention is to provide in a jack of this type means to vary the initial lowermost positions of the saddles, whereby to permit them to co-act and to function properly with automobiles of different types and styles.

For the accomplishment of these and other desirable objects, I have devised the present preferred embodiment of the invention illustrated in the accompanying drawing which should be considered in connection with the following detailed description, and for simplicity in the drawing like reference numerals have been employed throughout the views to designate the same parts of the structure.

In this drawing:—

Figure 1 is a side elevation of the new jack;

Figure 2 is a plan view of the same with some of the parts broken away; and

Figure 3 is a vertical central section through the operating means for the jack.

Referring to this drawing, it will be perceived that the main frame of the appliance includes a pair of substantially-horizontal, forwardly-converging channels-bars 11, 11 supported at their front ends on a pair of carrying-wheels 12, 12 mounted on an appropriate axle 13 extended through apertures or bearings therein and equipped at its opposite ends with carrying or ground wheels 14, 14, and, in addition, the rear ends of such frame bars have a shaft 15 fitted in aligned holes in the bars and extended outwardly from the opposite sides of the truck-frame.

As will be readily understood, the specified construction constitutes a wheeled-truck and it is on the frame of such truck that the jack or lifting and lowering mechanism is mounted, such portion of the appliance comprising two open or skeleton rock-arms or levers on opposite sides of the main truck-frame and connected together to rise and to descend in unison and operated by suitable hydraulic means.

Each such arm or lever comprises a flat, upwardly-arched, inner bar 16 and a similar upwardly-bowed, bent, outer bar 17, these two companion bars diverging somewhat toward the front end of the jack, as shown in Figure 2.

Each such pair of bars are connected together by rivets, rods, or bolts 18, 19 and the two frame arms or levers are joined together and held properly spaced or separated by bolts 21 and appropriate spacing sleeves 22, 23, and, in addition, an upper cross-plate 24 rests and bears on the top edges of all four bars 16, 17, 16, 17 and by means of bolts 25 such plate is fastened to smaller tie-plates 26, 26 beneath and pressing against the lower edges of the two pairs of bars 16, 17, 16, 17.

By these simple means the two arms or levers are connected together as a unit to rock around the shaft 15 on which their rear ends are mounted for such turning action.

Each such arm or lever 16, 17 at its front end has a short cross-shaft 27 on which is rockingly and slidingly mounted the bifurcated end 28 of a lifting saddle or foot 29 rockingly connected at 31 to the front end of a rod 32 extending to the rear of the appliance through a horizontal slot 33 in the corresponding end portion 34 of a casting having a central cylindrical or shaft portion 35 oscillatory in standards 36, 36 upstanding from the frame-bars 16, 16.

The rear portion of each such rod is screw-threaded as is fully shown in Figures 1 and 2, and such portion of each rod is equipped with two nuts 37, 37 arranged and adapted to bear against the opposite faces of the part 34, whereby the effective length of the rod between the parts 34 and 31 may be easily and readily adjusted to vary the initial position of the corresponding saddle or foot 29, such capability of the latter for adjustment being shown in full and dotted lines in Figure 1, in which latter position the saddle descends so as to practically touch the floor or ground, thus allowing it to pass beneath a very low part of the car to be raised.

As is customary in similar constructions, the purpose and function of these rods is to maintain the saddles or feet substantially in their original positions with relation to the horizonal as they ascend and descend.

As will be easily understood, these saddles or lifting members 29 are slidingly adjustable toward and from one another on their shafts 27 in order that they may be correctly positioned to engage the proper or accessible parts of the automobile, and, to obtain such adjustment, it is merely necessary to loosen the nuts 37, 37 and slide the parts sidewise to the desired position and then to tighten the nuts, the slots 33, 33 permitting such lateral movement of the rear ends of the rods, and, of course, the rods move with the saddles at their front ends.

It should be noted that these saddles or lifting elements 29, 29 extend forwardly beyond the ground wheels 12, 12, and therefore the latter do not interfere with the engagement of a very low part of the vehicle.

An hydraulic casing or cylinder 38 is rockingly mounted between and on the two lifting arms or levers 16, 17, 16, 17 by means of aligned, outstanding trunnions 39, 39 on the member 38 which are accommodated in bearings in the arms, whereby, as the arms ascend and descend in performing their load lifting and lowering operations, the cylinder travels with, and rocks with relation to, them.

The cylinder 38 (see Figure 3) houses a plunger 41 which projects downwardly out of the lower open end of the cylinder below which it is rockingly mounted on the axle 13.

An oil supply chamber 42 at one side of and rigid with the cylinder houses a small pump cylinder 43 in which a plunger 44 is adapted to reciprocate, the plunger being connected by a link 45 to an arm 46 on a short rock shaft 47 designed to be actuated by a handle 48 equipped internally with a latch-rod 49 fitted with a terminal handle 50 by means of which it may be shifted longitudinally, such rod having at the lower end of the handle a detent or catch 51 adapted, when it is in a companion notch 52 in a segment 53 fixed on the top wall of the oil chamber, to lock the parts together so that the handle may be used to pull or push the entire truck-jack into place, but, on the other hand, when the catch or detent is withdrawn from its notch by means of the knob 50, the handle 48 may be rocked up and down in the usual manner to operate the pump 43, 44.

In operation, as when a vehicle is being lifted by the companion saddles, oil from chamber 42 enters the cylinder 43 of the pump through a ball check-valve 54 when the plunger 44 rises and, when the plunger descends, the pumped oil passes out through a check-valve 55 and an associated pipe 56 into the cylinder 38, causing the ascent of the cylinder which carries the rock-arms 16, 17, 16, 17 with it by reason of the trunnion connections 39, 39 between the two.

The elevated position of the jack is indicated in dotted lines in Figure 1.

When it is desired to lower the saddles, the operator manipulates a hand-actuated valve 57 in a pipe 58 connecting the upper portion of the cylinder 38 with the interior of the oil supply chamber or reservoir 42, whereby the oil in the cylinder 38 may pass or flow more or less slowly out of the cylinder into the reservoir, thus effecting the gradual lowering of the cylinder, jack, and its load.

It will be understood that when the arms 16, 17, 16, 17 swing upwardly around the axis of shaft 15 the connecting rods 32, 32 rock upwardly around the axis of shaft 35, and inasmuch as the distances between the axes of the parts 27 and 31 and 15 and 35 are substantially the same, the mechanism constitutes more or less of a parallel motion mounting whereby the saddles maintain their initial positions to the horizontal throughout their various positions of elevation.

Those acquainted with this art will appreciate that the invention as defined by the following claims is not restricted to the precise and exact features of construction illustrated and described and that various mechanical modifications may be resorted to without departure from the heart and essence of the invention and without the loss or sacrifice of any of its material benefits and advantages.

I claim:

1. In a truck-jack, the combination of a truck-frame, front and rear carrying-wheels on which said truck-frame is mounted, load lifting and lowering arms at opposite sides of said truck-frame and hinged near their rear ends to said frame for vertical swinging movement, means uniting said arms to cause their simultaneous and equal ascent and descent, load-engaging saddles rockingly mounted on the front ends of said arms and having capacity for adjustment laterally of the truck-frame, means to rock said arms and their saddles up and down to raise and lower the load, rods hinged at their front ends to said saddles, and means rockingly connecting the rear ends of said rods to said truck-frame, said rods being capable of lateral adjustment in said latter means, said rods maintaining said saddles in substantially their original positions with relation to the horizontal during their ascent and descent.

2. The structure presented in claim 1 in which said load-engaging saddles in their lowermost positions extend forwardly beyond the front carrying-wheels of the truck-frame.

3. The structure presented in claim 1 in combination with means to render said rods adjustable longitudinally with reference to said frame to rock said saddles on said arms to adjust their initial positions.

4. The structure presented in claim 1 in combination with an axle for said rear carrying-wheels and in which construction said arm-rocking means comprises a plunger rockingly mounted at its lower end on said axle, a cylinder accommodating and slidable on said plunger and rockingly mounted on said arms, and means to force liquid into said cylinder and to deliver it therefrom to raise and lower said arms, saddles and cylinder.

5. The structure presented in claim 1 in which said arm-rocking means comprises a plunger rockingly mounted at its lower end on said frame, a cylinder accommodating and slidable on said plunger and rockingly mounted on said arms, and means to force a liquid into said cylinder and to deliver it therefrom to raise and lower said arms, saddles and cylinder.

6. In a truck-jack, the combination of a truck-frame, front and rear carrying-wheels on which said truck-jack is mounted, load lifting and lowering arms at opposite sides of said truck-frame and hinged near their rear ends to said frame for vertical swinging movement, a cross-shaft on the front end of each of said arms, a load-engaging saddle rockingly and slidingly mounted on each of said cross-shafts, a slotted member rockingly mounted on and near the rear end of said truck-frame and positioned transversely to said frame, rods hinged to said saddles and extended rearwardly through the slots of said member, the rear parts of said rods being screw-threaded, nuts on said threaded portion of each of said rods and adapted to engage the opposite faces of said member and designed to permit adjustment of the rod and the lowermost position of the corresponding saddle, and means to rock said arms and their saddles up and down as a unit to lift and to lower the load, said saddles being capable of adjustment on their cross-shafts and said rods being capable of adjustment in said slots transversely of the truck-frame.

7. The structure set forth in claim 6 in which said saddles in their lowermost positions extend forwardly beyond the front carrying-wheels of the truck.

8. The structure presented in claim 6 in which the means to rock the arms and saddles comprises a plunger rockingly mounted at its lower end on said truck-frame, a cylinder accommodating and slidable on said plunger and rockingly mounted on said arms, and means to force a liquid into said cylinder and to deliver it therefrom to raise and lower said arms and their saddles.

9. The structure set forth in claim 6 in which said means to rock said arms and saddles comprises a plunger rockingly mounted at its lower end on said frame, a cylinder accommodating and slidable on said plunger and rockingly mounted on said arms, and means to force a liquid into said cylinder and to deliver it therefrom to raise and lower said arms and their saddles including a hinged operating handle adapted to be rocked up and down, and releasable means to lock said handle relative to said cylinder to preclude said rocking movement thereof.

HARRY F. STIELER.